United States Patent Office 3,660,317
Patented May 2, 1972

3,660,317
SPHEROIDALLY OR BEAD-SHAPED POROUS CONDENSATION-TYPE ION EXCHANGE PRODUCTS
Kishima Masatsugu, Kobe, Japan, assignor to C. Weinberger & Co., Ltd., Osaka-shi, Kita-ku, Japan
No Drawing. Continuation of application Ser. No. 774,504, Nov. 8, 1968. This application Nov. 3, 1970, Ser. No. 86,643
Claims priority, application Japan, Nov. 14, 1967, 42/18,142
Int. Cl. C08g 9/06
U.S. Cl. 260—2.2 C
6 Claims

ABSTRACT OF THE DISCLOSURE

Process of producing porous ion-exchange resin particles by forming a precondensate liquid mixture of a polyfunctional aldehyde, a phenol and an amine; incorporating a soluble filler material in such precondensate liquid; dispersing this mixture in a non-aqueous non-solvent liquid medium composed of a dialkyl phthalate higher than methyl and an alkyl chloride, preferably carbontetrachloride; condensating the precondensate in bead form during such agitation, completing the condensation by heat-treatment and then dissolving out the filler material to form a porous ion-exchange product.

---

This application is a continuation of application Ser. No. 774, 504, filed Nov. 8, 1968.

The present invention relates to a novel ion-exchange product and a novel process for the preparation of spheroidal or bead-shaped products.

The novel water-insoluble, highly porous ion-exchange products of the present invention are prepared by a process comprising condensing a pre-condensate liquid, which is produced from water-soluble, condensable monomers with ion-exchange groups, and an aldehyde in the presence of an acid catalyst and soluble fillers; dispersing the pre-condensate liquid into small globules by agitation in a non-aqueous medium which is a non-solvent for the pre-condensate, composed of dialkyl phthalate and alkyl halide, which mixture is a non-solvent for the pre-condensate, so as to produce upon condensation of such resin spheroidally-shaped, solid beads having a proper particle size; completing the condensation of the resin by a heat-treatment at suitable temperatures; and removing the soluble fillers in the bead products by washing with a suitable solvent.

The spheroidal or bead-shaped porous ion-exchange products of the present invention are very useful in decolorization or deodorization applications.

The porous ion-exchange products, and the novel process for their preparation, according to the present invention, are significantly superior to those of previous other patents.

It is an object of the present invention to provide novel condensate ion-exchange products which possess a high capacity for adsorption of a color material or a component of a bad odor.

It is another object of the present invention to provide novel homogenous condensation products by suspension condensation, in which the heat of condensation is dissipated more uniformly as compared with block condensation.

It is a further object of the present invention to provide a novel process for the preparation of spheroidal or bead-shaped condensation products having a homogenous particle size distribution at good yield.

It is an additional object of the present invention to provide a process for preparing novel condensation ion-exchange resin products which possess a high porosity and a large active surface area.

Other objects will be apparent to those skilled in the art from a reading of this description.

The process of the present invention is applicable to the preparation of the following condensation products.

Water-soluble aromatic or aliphatic amines, or phenolic condensate derivatives thereof, are condensed with bi- or polyfunctional aldehyde, such as formaldehyde, or glyoxal, in the presence of an acid catalyst in an aqueous medium to provide water-insoluble products which may be amphoteric.

The novel highly porous ion-exchange products of the present invention are prepared in accordance with the following procedures. For example, at first a pre-condensate liquid of metaphenylenediamine, phenol, formaldehyde, acid catalyzer and fillers is prepared under cooling. The pre-condensate liquid is then added, with agitation, to a non-aqueous, non-solvent medium of suitable composition composed of dialkyl phthalate (allyl group is higher than methyl group) and carbon tetrachloride which tends to prevent or minimize the agglomeration or fusion of the desired globules or spheroidal particles which are formed as a result of rapidly stirring or agitating the mixtures.

The reaction mixtures are agitated at ordinary or proper temperatures, until resin beads are formed as a result of condensation. The spheroidal or bead resins so obtained are removed from the suspending medium and heated at 100° C. for several hours to permit the complete condensation of the resin condensate.

The resin beads are washed and the fillers are dissolved out of condensation products to provide high porous ion-exchange products. A non-aqueous, non-solvent medium composed of di-alkyl phthalate and alkyl halide has a proper density, viscosity and hydrophiliclipophilic balance (HLB) for dispersing the pre-condensate liquid-uniformly and also has an excellent ability for keeping up the stable state of suspension during condensation.

As alkyl group of diester is higher, the protective effect to prevent the agglomeration of particles is larger.

The alkyl halide component of the non-aqueous medium is non-soluble in and non-reactive with the pre-condensate liquid and acts to adjust the density of the suspending medium relative to the pre-condensate liquid. The stable dispersion of the pre-condensate liquid is maintained in co-operation with these actions of two non-aqueous medium components. It has been found that where the ratio of the pre-condensate liquid to a non-aqueous medium is of the order of 10–30%, suspension is very satisfactory and the non-aqueous medium may be used many times by adding a small additional amount of make-up non-aqueous medium to yield the desired particle size of resins.

Water-soluble, condensable monomers which can be used in the present invention are derivates of aromatic or aliphatic amines, such as phenylene-diamine, aminophenol, ethyleneimine, urea, dicyandiamide, etc. and derivates of phenol and resorcinol.

Aldehydes employed in the present invention are water-soluble, bi- or polyfunctional aldehyde, for example formaldehyde, acetoaldehyde, glutar-aldehyde or glyoxal.

Alkyl halides which may be employed should be non-reactive with the pre-condensate liquid and have a higher specific gravity than 1.0 and also be mutually soluble with dialkyl phthalate in any proportion.

The dialkyl phthalate which may be employed should be a higher ester than the methyl ester, because the dimethyl ester is water-soluble.

It is preferred to use a mixture composed of lower and higher alkyl ester in order to improve the dispersion effect of the pre-condensate liquid and to facilitate the removal of the suspending medium from the condensation products.

The fillers which may be employed should be soluble in the pre-condensate liquid and dissolvable out of the condensation product to yield a very porous material with a large active surface area.

In order to disclose more clearly the nature of the present invention, specific examples illustrating the preparation of the porous ion-exchange products of the present invention will hereinafter be described.

This is done solely by way of example and is intended neither to delineate the scope of the invention nor to limit the ambit of the appended claims.

EXAMPLE 1

80 parts of meta-phenylenediamine and 60 parts of phenol were dissolved in an aqueous hydrochloric acid solution containing 50 parts of conc. HCl (37%) and 300 parts of water. The solution was cooled to 5° C. and 150 parts of formalin solution were added to produce the pre-condensate liquid. The pre-condensate liquid so obtained was added to a non-aqueous, non-solvent medium, composed of 300 parts of dioctyl phthalate and 500–700 parts of carbon tetrachloride, with agitation at a proper rate and the pre-condensate liquid was suspended therein and dispersed into spheroidal or bead form having a desired particle size. The reaction mixtures were agitated at ordinary or proper temperatures, until solid resin beads were formed as a result of condensation. After condensation, the suspending medium was removed from the beads by filtration and the beads were washed with quantities of fresh carbon tetrachloride and methanol. Beads, so obtained were heated at 100° C. for 15–20 hours to complete condensation. The beads having the same particle size, were prepared of approximately 80% by weight of starting material. These resins, when regenerated with sodium hydroxide and hydrochloric acid were found to have an adsorption capacity of 1.20 meq./g. for ammonia gas of the moisture content of 50% and an apparent density of 380 gms./l.

EXAMPLE 2

70 parts of meta-phenylenediamine, 70 parts phenol and 100 parts of water-soluble inorganic salts were dissolved into aqueous hydrochloric acid solution containing 50 parts of conc. HCl (37%) and 300 parts of water. The solution was cooled to 5° C. and 150 parts of formalin solution (37%) were added to provide the precondensate liquid. The pre-condensate liquid was added to a non-aqueous, non-solvent medium composed of 150 parts of diethyl phthalate, 500 parts of dioctyl phthalate and 800 parts of carbon tetrachloride. In accordance with the same procedure in Example 1, the mixture was stirred and the precondensate liquid was dispersed into uniformly spheroidal or bead form particles. The suspension condensation was caused in the presence of salts and the bead-shape resin particles were prepared having a homogeneous particle size distribution as the case of Example 1. After the heat-treatment to complete condensation as in Example 1, the resin beads were washed thoroughly and the salts were dissolved out from the condensation products. These resins so obtained were found to have an adsorption capacity of 1.98 meq./gr. for ammonia gas, an apparent density of 280 gms./l., and an active surface area of approximately 50 m.²/gr.

This material is highly porous and very useful for the decolorization or deodorization.

I claim:

1. A process for preparing a water-insoluble, highly porous amphoteric ion-exchange decolorizer or deodorizer, which comprises mixing an aromatic amine, a polyfunctional aldehyde and a phenol in the presence of an acid catalyst; forming a precondensate product from said mixture, dispersing said precondensate product as spheroidal particles in a non-aqueous, non-solvent medium, composed of the mixtures of at least one dialkyl phthalate, having an alkyl moiety higher than methyl, and an alkyl halide, with agitation; condensing said precondensate product to spheroidally-shaped, solid beads of the condensed resin; and completing the condensation by heat-treatment.

2. Process claimed in claim 1, wherein said aldehyde is at least one member selected from the group consisting of formaldehyde, glyoxal, acetoaldehyde and glutaraldehyde.

3. Process claimed in claim 2, wherein said amine is at least one member selected from the group consisting of phenylene, diamine, aminophenol, ethyleneimine, urea and dicyandiamide.

4. Process claimed in claim 3, wherein said phenol is at least one member selected from the group consisting of phenol and resorcinol.

5. Process claimed in claim 4, wherein said non-aqueous medium is a mixture of dioctyl phthalate and carbon-tetrachloride.

6. Product of the process of claim 5.

References Cited

UNITED STATES PATENTS

| | | | |
|---|---|---|---|
| 2,521,288 | 9/1950 | Evers | 260—45 |
| 2,650,177 | 8/1953 | Meijer | 127—46 |
| 2,671,059 | 3/1954 | Smit | 260—2.1 |
| 3,062,760 | 11/1962 | Dermody et al. | 260—2.5 |
| 3,322,695 | 5/1967 | Alfrey et al. | 260—2.5 |
| 3,326,822 | 6/1967 | Albertson | 260—2.5 |

MELVIN GOLDSTEIN, Primary Examiner

U.S. Cl. X.R.

260—2.1 C

UNITED STATES PATENT OFFICE
CERTIFICATE OF CORRECTION

Patent No. 3,660,317            Dated May 2, 1972

Inventor(s) Kishima Masatsugu

It is certified that error appears in the above-identified patent and that said Letters Patent are hereby corrected as shown below:

<u>Col. 1, lines 9-10</u>

"Nov. 14, 1967, 42/18,142" should be -- Nov. 18, 1967, 42 74349 --.

<u>Col. 3, line 35</u>

"The beads" should be -- Beads --.

Signed and sealed this 20th day of March 1973.

(SEAL)
Attest:

EDWARD M. FLETCHER, JR.
Attesting Officer

ROBERT GOTTSCHALK
Commissioner of Patents